March 3, 1970  W. W. HUNT, JR  3,499,142
APPARATUS FOR DETERMINING THE ELECTRON REFLECTION
COEFFICIENT OF A SURFACE
Filed April 10, 1968
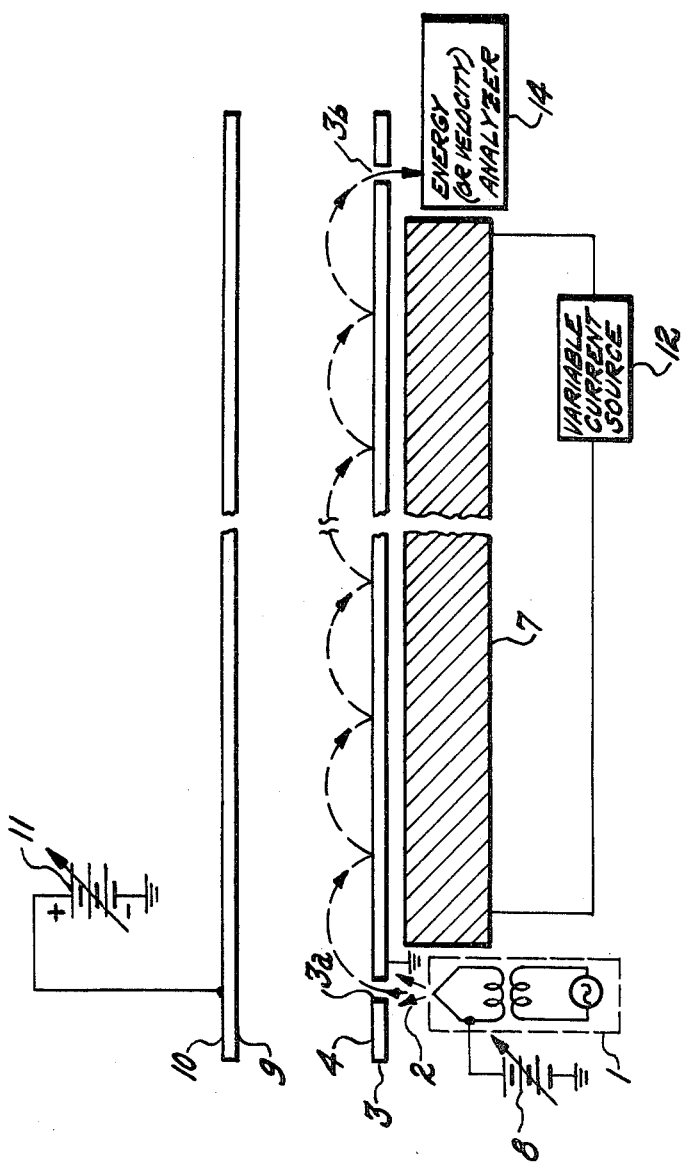
INVENTOR.
WILLIAM W. HUNT JR.
BY Harry A. Herbert Jr
George Fine
ATTORNEYS 3,499,142
APPARATUS FOR DETERMINING THE ELECTRON REFLECTION COEFFICIENT OF A SURFACE
William W. Hunt, Jr., Chelmsford, Mass., assignor to the United States of America as represented by the Secretary of the Air Force
Filed Apr. 10, 1968, Ser. No. 720,253
Int. Cl. H01j 37/00
U.S. Cl. 250—49.5          5 Claims

ABSTRACT OF THE DISCLOSURE

Apparatus for determining the energies (velocities) at which the electron coefficient of a surface exhibits maxima and minima by forcing an electron beam initially having a broad energy (velocity) distribution to undergo a number of successive reflections at the surface to be studied and then energy (velocity) analyzing the emerging beam. The energy (velocity) distribution will have sharp maxima and minima at those energies where the reflection coefficient exhibits corresponding maxima and minima.

BACKGROUND OF THE INVENTION

The present invention relates to apparatus for determining the energies or velocities at which a surface exhibits extremes of electron reflection/absorption.

Because of the well-known difficulties in forming, maintaining, and using very low energy electron beams with good energy or velocity distribution, it has been exceedingly difficult to determine at what energies (or velocities), the electron coefficient of a particular surface exhibited maxima or minima. The prior art method and apparatus for determining energies at which the reflection coefficient exhibited maxima and minima required energy analysis of the incident electrons. The present invention makes aforesaid determination relatively simple and highly accurate and thus makes available significant information about a particular surface.

It is to be noted that two patent applications have been filed of even date herewith entitled "Apparatus to Control the Energy Distribution of an Electron Beam" and "Magnetic Apparatus to Control the Energy Distribution of an Electron Beam" also by William W. Hunt, Jr. The two aforesaid patent applications include further descriptions relating to the reflection coefficient of surfaces.

BRIEF SUMMARY OF THE INVENTION

The reflection coefficient R of a given surface for low-energy electrons (say for $E \leq 3-5$ ev.) is known to depend on the energy E with which the electrons hit the surface. Also, in this same energy range, the reflected electrons retain essentially all of their incident energy. [See for instance, Niedermeyer & Holzl, Phys. Stat. Sol. 11, 651 (1965).] The reflection coefficient $R(E)$ expresses the probability that an electron striking the surface with energy between E and $E+dE$ will be reflected rather than absorbed.

If a beam of electrons having an energy distribution $I(E)$ [such that $I(E)dE$ is the number of electrons crossing a plane normal to the beam current in unit time that has energy between E and $E+dE$ and such that $$I_0 = \int_{E=0}^{\infty} I(E) dE$$

is caused to strike a surface then some of the beam will be reflected and some will be absorbed. The reflected current is given by $$I_1 = \int_{E=0}^{\infty} R(E) I(E) dE$$

and the energy distribution of the reflected electrons is now $R(E)I(E)$. If the reflected beam is in some way forced to impinge again on the same surface, then the current after this second reflection will be given by $$I_2 = \int_{E=0}^{\infty} R^2(E) I(E) dE$$

and the energy distribution of the electrons in this now twice-reflected beam is $R^2(E)I(E)$. Similarly, after $n$, such reflections the current is $$I_n = \int_{E=0}^{\infty} R(E)^n I(E) dE$$

and the energy distribution is $R^n(E)I(E)$.

As the reflection coefficient undergoes maxima and minima as the incident energy (velocity) is increased from zero, then the electron energy (velocity) distribution of a multiply-reflected (diffracted) beam will have sharply defined peaks at energies (velocities) corresponding to each maxima in R overlapped by the initial energy (velocity) distribution.

The sharpness of these peaks will increase as $n$, the number of reflections, is increased. Consequently, an energy (velocity) analysis of the multiply reflected beam will accurately reveal the energies (velocities) at which the surface exhibits maximum reflection probability and that overlap significantly with the original energy distribution. If the original energy (velocity) distribution is the normal-component distribution characteristic of a thermionic emitter, it will be at least of the order of 0.1 ev. wide at half-height but perhaps not broad enough to give significant overlap with all reflection maxima. By repeating the experiment after acceleration of the original beam to successively higher energies, all reflection maxima can be overlapped, however.

Thus, the present invention provides apparatus for the determining the energies (velocities) at which the electron reflection coefficient of a surface exhibits maxima and minima by forcing an electron beam initially having a broad energy (velocity) distribution to undergo a number of successive reflections at the surface to be studied and then energy (velocity) analyzing the emerging beam. The energy (velocity) distribution will have sharp maxima and minima at those energies (velocities) where the reflection coefficient exhibits corresponding maxima and minima.

An object of the present invention is to provide an apparatus for determining the energies (velocities) at which the electron reflection coefficient of a surface exhibits maxima and minima.

Another object of the present invention is to provide an apparatus for determining the energies (velocities) at which the electron reflection coefficient of a surface exhibits maxima and minima by forcing an electron beam initially having a broad energy (velocity) distribution to undergo a number of successive reflections at the surface to be studied and then energy (velocity) analyzing the emerging beam.

The various features of novelty which characterize this invention are pointed out with particularity in the claims annexed to and forming a part of this specification. For a better understanding of the invention, however, its advantages and specific objects obtained with its use, reference should be had to the accompanying drawing and descriptive matter in which is illustrated and described a preferred embodiment of the invention.

DESCRIPTION OF THE PREFERRED EMBODIMENT

In the single drawing of the invention there is shown electron beam source 1 having variable voltage source 8 connected thereto to provide a variable control of electron beam 2. Electron beam source 1 is conventional and may be of the type utilized in cathode ray tubes. Electron beam 2 is comprised of low-energy electrons.

An appropriate reflecting surface 4 is provided by utilizing flat metal sheet 3 which is positioned such that the normal to reflecting surface 4 is perpendicular to an applied magnetic field B (everywhere perpendicular to and directed into the plane of the single drawing) that is provided by current flowing through solenoid 7. Flat metal sheet 3 is grounded. Flat metal sheet 3 includes input slot 3a and output slot 3b, and its surface is the reflecting surface 4. Parallel surface 9 is provided by utilizing flat metal sheet 10. Sheet 10 may also be grounded (see below).

Parallel surface 9 is used for applying an electric field perpendicular to the aforementioned magnetic field. The electric field is provided by connecting the positive side of variable voltage source 11 to metal sheet 10 and grounding the negative side thereof. Variable voltage source 11 is variable from 0 to the values required for In the operation of the apparatus, electron source 1 and metal sheet 3 and 10 are mounted in the conventional vacuum systems utilized, for example, in cathode ray tubes. Solenoid 7 and variable voltage sources 8 and 11 may be mounted in the conventional manner externally to the vacuum system. Metal sheets 3 and 10 are positioned in the vacuum system in a manner conventional to the cathode ray tube technique.

In the opeartion of the apparatus, electron source 1 is positioned so that electron beam 2 is directed through input slot 3a. Electrons having the initial energy (velocity) distribution characteristic of source 1 are made to impinge on the reflecting surface 4. The magnetic field causes the reflected electrons to be curved back to hit the surface again and again. The number of reflections being determined by the radius of curvature of the $e$'s in the magnetic field and by the length of the reflecting surface in the direction perpendicular to the magnetic field. With an electric field also applied by making opposing surface 9 positive with respect to reflecting surface 4, then the electrons follow trochoidal rather than circular trajectories and have their characteristic energy (velocity) distribution only at the plane of reflecting surface 4. They travel the major portion of their trajectories at higher energies so that space charge effects are lessened. In this case, the number of reflections can be varied by changing the electric field by varying voltage source 11. The beam having the narrow filtered energy/volocity distribution is then extracted by allowing it to pass through output slit 3b located exactly $n$ times the distance between successive impacts beyond the point of initial impact. In practice the $n$-times-reflected ribbon of monoenergetic electrons would be scanned to impinge on the center of slit 3b by varying the voltage to the field-forming plate 10 or by varying the magnetic flux density by varying the current flow through solenoid 7, by means of variable current source 12. Solenoid 7 is a conventional source or means for forming a magnetic field. In a different embodiment, the solenoid may be replaced by a permanent magnet.

It is noted that the agnetic field mode of operation may be utilized alone to obtain circular trajectories or the magnetic field in combination with an electric field is used to obtain trochoidal trajectories. To obtain exclusively magnetic field operation, voltage source 11 is eliminated or varied to obtain a zero voltage output and to obtain a combination operation of magnetic and electric field, voltage source 11 is increased to the desired magnitude.

It is noted again that because of the magnetic field (when no electric field is applied) the reflected electrons follow a circular trajectory back to surface 4 and are reflected again and again as indicated in the drawing—the number of reflections being determined by the radius of curvature of the electrons in the B-field $$\left(r = \frac{m}{e}\frac{v}{B}\right)$$

and by the length of surface 4 in the direction perpendicular to the B-field. In this case, the energy (velocity) distribution can be determined by moving exit slit 3b in the direction parallel to the line of impacts; since only those electrons will enter slit 3b whose energies (velocities) are such that $D = 2nr = 2n(m/e)v/B$ where D is the distance from entrance slit 3a to exit slit 3b. Conversely, slit 3b can remain fixed and B, the flux density of the magnetic field can be varied to give the velocity analysis. Alternatively, independent energy (velocity) analyzer 14 is mounted at the output of exit slit 3b to avoid having to rely on the uniformity and absolute value of the B-field over the entire extent of the apparatus. The electron beam output from slit 3b is directed to energy analyzer 14. Consequently, on energy (velocity) analysis of the multiply reflected beam will accurately reveal the energies (velocities) at which surface 4 exhibits maximum reflection probability and that overlap significantly with the original energy distribution. Energy (velocity) analyzer 14 is conventional and can be such as the 127° analyzer described in The Canadian Journal of Physics, Volume 38, pages 787 to 796 published in 1960 in an article entitled, "An Improved Electrostatic Electron Selector" by B. Marmet and L. Kerwin.

It is emphasized again that by working field-forming sheet 10 positive with respect to reflecting surface 4—i.e., by applying an electric field perpendicular both to the surface and to the magnetic field—the electrons can be made to follow trochoidal rather than circular trajectories. In this case, they have their characteristic energy distribution only at the plane of the surface—at all points above the plane they have higher energies, and hence space charge effects are reduced; since the size of the trochoids, and hence the distance between reflections is directly proportional to the E (electric)-field, the number of collisions between the entrance and exit slits can be controlled by varying the voltage applied to the field-forming sheet. Similarly, it can be used to center the emerging multiply-reflected beam on the exit slit.

Another embodiment requires no electric or magnetic fields at all, it consists of a long tube or set of closely-spaced parallel plates whose inner surface(s) is the surface to be studied. Electrons having the desired initial energy distribution are caused to impinge on the surface near one end. After being reflected by the walls many times, the electrons emerging from the other end are energy-analyzed with a spherically symmetric retarding potential analyzer to give the desired result.

What is claimed is:

1. Apparatus for determining the energies at which the electron reflection coefficient of a surface undergoes maxima and minima and thus to characterize the surface comprising an electron beam source, said beam source providing an intial electron beam of low energy electrons, an electron reflecting surface, means to force said electron beam to undergo successive collisions with said reflective surface to provide a resultant beam of substantially narrower energy distribution than said initial electron beam, and means to energy analyze said resultant beam for determining the energies at which the electron reflection coefficient of a surface undergoes maxima and minima and thus to characterize the surface.

2. Apparatus as defined in claim 1 wherein said reflecting surface includes input and output means, said input means receiving said initial electron beam and said output means providing said resultant beam, and electromagnetic energy means providing a magnetic field to force said electrons to undergo said successive collisions.

3. Apparatus as described in claim 2 further including means to vary the intensity of said magnetic field.

4. Apparatus as described in claim 2 further including means for applying an electric field perpendicular to said magnetic field, said electric field operating to change the trajectory of said electron beam.

5. Apparatus as described in claim 4 further including means to vary the intensity of said electric field.

References Cited

UNITED STATES PATENTS 2,769,911   11/1956   Warmoltz _____ 250—41.9
3,337,729   8/1967   Thomas et al. _____ 250—49.5

WILLIAM F. LINDQUIST, Primary Examiner

U.S. Cl. X.R.

250—41.9